United States Patent
Gotzig et al.

(10) Patent No.: US 7,349,820 B2
(45) Date of Patent: Mar. 25, 2008

(54) METHOD AND DEVICE FOR DETERMINING THE POSITION OF AT LEAST ONE POINT OF REFLECTION ON AN OBSTACLE

(75) Inventors: Heinrich Gotzig, Heibronn (DE); Oliver Eckstein, Felbach (DE); Marion Henry, Nantes (FR); Thomas Jung, Untergruppenbach (DE); Nicolas Jecker, Esslingen (DE)

(73) Assignee: Valeo Shalter und Sensoren GmbH, Bietigheim-Bissingen (DE)

(*) Notice: Subject to any disclaimer, the term of this patent is extended or adjusted under 35 U.S.C. 154(b) by 0 days.

(21) Appl. No.: 10/583,213

(22) PCT Filed: Dec. 2, 2004

(86) PCT No.: PCT/EP2004/053242

§ 371 (c)(1),
(2), (4) Date: Jun. 16, 2006

(87) PCT Pub. No.: WO2005/061985

PCT Pub. Date: Jul. 7, 2005

(65) Prior Publication Data

US 2007/0124106 A1    May 31, 2007

(30) Foreign Application Priority Data

Dec. 19, 2003    (DE) .................... 103 61 315

(51) Int. Cl.
  *G06F 7/00*    (2006.01)
(52) U.S. Cl. ............. 702/150; 702/151; 702/152; 702/153; 702/155; 702/158; 701/301; 701/300; 701/96; 340/345; 340/346
(58) Field of Classification Search ............ 702/150; 701/96, 300, 301; 340/345, 346
See application file for complete search history.

(56) References Cited

U.S. PATENT DOCUMENTS 6,289,282 B1 * 9/2001 Hassler et al. .............. 701/301
2003/0128153 A1   7/2003 Paradie et al.

FOREIGN PATENT DOCUMENTS

EP    0 987 563 B1    11/2003
EP    1 361 459 A1    11/2003

OTHER PUBLICATIONS

Mansfield, W.: "Funkortungs- und Funknavigationsanlagen" Heidelberg, Germany; 1994 (5 pages).

(Continued)

*Primary Examiner*—Bryan Bui
*Assistant Examiner*—Sujoy Kundu
(74) *Attorney, Agent, or Firm*—Osha Liang LLP (57) ABSTRACT

The invention relates to a method for determining the position (x, y) of at least one point of reflection ($R_{1-2}$) on an obstacle. According to traditional methods of this kind a first distance ($r_1$) between the point of reflection ($R_{1-2}$) and a first position ($x_1$) of a distance measuring device is calculated by evaluating a time period between the emission of a transmission signal and reception of a reflection signal. In order to state the unsharp position of the point of reflection thereby obtained even more precisely, in addition to the first distance ($r_1$), a second distance ($r_2$) of the point of reflection is calculated with respect to a second position ($x_2$) of the distance measuring device in analogy to the calculation of the first distance ($r_1$) and then a defined position (x, y) is calculated from the pair of variates ($x_1$, $r_1$) ($x_2$, $r_2$) so obtained using the triangulation method.

16 Claims, 4 Drawing Sheets

OTHER PUBLICATIONS

German Search Report dated Jan. 13, 2004; application No. 103 61 315.3 (3 pages).

International Search Report dated Mar. 15, 2005; application No. PCT/EP2004/053242 (12 pages).

* cited by examiner

METHOD AND DEVICE FOR DETERMINING THE POSITION OF AT LEAST ONE POINT OF REFLECTION ON AN OBSTACLE

The invention relates to a method and a computer program for determination of the position of at least one reflection point on an obstruction with respect to a distance measurement apparatus, in particular an ultrasound distance measurement apparatus. The invention also relates to a data storage medium with the computer program, as well as the distance measurement apparatus for carrying out the method.

Distance measurement apparatuses for determination of the distance to and/or the position of a reflection point on an obstruction with respect to the distance measurement apparatus are in principle known from the prior art. The known distance measurement apparatuses, be they ultrasound, infrared or radar-assisted apparatuses, typically determine the position of the reflection point by first of all transmitting a transmitted signal to the obstruction with the reflection point. The transmitted signal is then preferably reflected at the reflection point such that at least a portion of the reflected signal is reflected back as a received signal to the distance measurement apparatus, where it can be received. The distance between the current position of the distance measurement apparatus and the position of the reflection point on the obstruction can then be deduced by multiplication of the determined time period between the transmission of the transmitted signal and the reception of the received signal by the respective propagation speed of the transmitted signal, and a correction factor of 0.5.

However, this is dependent on some proportion of the transmitted signal being reflected back from the reflection point to the distance measurement apparatus in such a way that the tangential plane on the obstruction at the reflection point is at least essentially at right angles to the propagation direction of the transmitted signal at the reflection point.

This precondition is typically generally satisfied for obstructions which are at least essentially bounded by straight lines, for example the side areas of parked vehicles, when, for example, the distance measurement apparatus is installed in the side area of a passenger vehicle which is moving parallel to the side surface of the obstruction, that is to say is moving past it at a constant distance. However, compliance with this precondition is problematic when the aim is to use the described method to identify contours with curved boundaries. A problem such as this occurs in particular when the position of a contour profile, for example of the front bumper of a parked vehicle as an obstruction, is intended to be determined precisely by a vehicle which is driving past and has the distance measurement apparatus installed. The position of the contour and/or length of the obstruction which is then measured with respect to the actual contour position and/or with respect to the actual length of the obstruction is dependent on the polar diagram of the distance measurement apparatus, and on its sensitivity.

Traditionally, distance measurement apparatuses with a broad polar diagram in the horizontal direction and a sensitive sensor system are used for said position determination process, in order to make it possible to achieve stable measurements. Distance measurement apparatuses such as these transmit, for example, in the horizontal direction at an angle of ±45° with respect to a direction at right angles to the direction of travel of the vehicle driving past, when the distance measurement apparatus is installed in its side area. This traditionally ensures that the obstruction at the roadway edge is identified very early, that is to say typically even before the vehicle driving past has reached the level of the obstruction, and that the obstruction can also still be detected on the basis of a beam component directed in the rearward direction even if the vehicle driving past has at least partially already driven passed it. This early identification and subsequent observation, which on the one hand are advantageous, have the disadvantage, however, that the position of the external contour of the obstruction/motor vehicle, in particular in the area of rounded corners of the obstruction, cannot be determined exactly; typically, the described measurement method produces excessively large obstruction lengths.

Against the background of this prior art, the object of the invention is to develop a method for determination of the position of at least one reflection point on an obstruction with respect to a distance measurement apparatus, a computer program and the distance measurement apparatus itself, as well as a data storage medium with the computer program, in such a manner that the position of the reflection point on the surface of an obstruction which, in particular, is bounded by curved lines can be determined more precisely.

This object is achieved by the method as claimed in patent claim 1. This method is characterized by the following steps: calculation of a second distance of the reflection point with respect to a second position of the distance measurement apparatus analogously to the calculation of the first distance and calculation of the position of the reflection point with the aid of the triangulation method from a first value pair, comprising the first position of the distance measurement apparatus and the first distance and a second value pair, comprising the second position of the distance measurement apparatus and the second distance.

According to the invention, the position of the reflection point is advantageously no longer calculated just on the basis of one value pair, but on the basis of two value pairs. All that has been possible until now using just one value pair is to state that the reflection point may lie on a circle with the distance associated with that value pair around that position of the distance measurement apparatus which is likewise associated with that value pair. It is not possible to make any more precise statements with regard to the position of the reflection point on the circle with just the first value pair. However, this is precisely what the additional evaluation of the second value pair that is provided according to the invention allows, which likewise localizes the reflection point on a circle, but on a circle with the second position of the distance measurement apparatus as the center point. The position of the reflection point, which in the end is accurate, can then be determined with the aid of the triangulation method from these two value pairs, when the circles which are represented by the two value pairs intersect at least one point. This intersection point then represents the precise x, y position of the reflection point.

One advantageous feature of the method according to the invention is that it is not absolutely essential to always determine both the x position and the y position of the reflection point. In fact, the method according to the invention allows separate calculation of the x coordinate or y coordinate of the position of the reflection point. A calculation such as this of only one of the coordinates of the position of the reflection point makes it possible to save computation time and may therefore be worthwhile, in particular for cost and/or time reasons.

The calculation of the x coordinate can be carried out independently of the y coordinate, and vice versa.

The position calculation based on the method according to the invention can be improved by ensuring that the value pairs which are used for the calculation of the position are selected from a large number of value pairs which represent a standard trend or a standard contour, and has no value pairs that are not consistent with this trend, or has been smoothed in advance.

If the method according to the invention is used to determine the positions for a large number of reflection points, with the large number of positions or reflection points representing the contour of the obstruction, it is advantageous for the calculated x and/or y coordinates of the individual reflection points to be checked to determine whether the magnitude of the difference between them and the x or r coordinates of the first or second positions of the distance measurement apparatus are less than predetermined threshold values.

The selection of value pairs from a large number of value pairs, as is in each case required for the calculation according to the invention of positions of different reflection points, can in principle be carried out as required; this means that, in principle, any two value pairs from the large number can be used for calculation of the position of a reflection point.

The object of the invention as stated above is also achieved by a computer program and a distance measurement apparatus for carrying out the method according to the invention, as well as by a data storage medium with the computer program. The advantages of these solutions correspond to the advantages stated above with respect to the claimed method.

A total of six figures are attached to the description, in which.

The method according to the invention will be described in detail in the following text with reference to the figures that have been mentioned.

Figure 1:
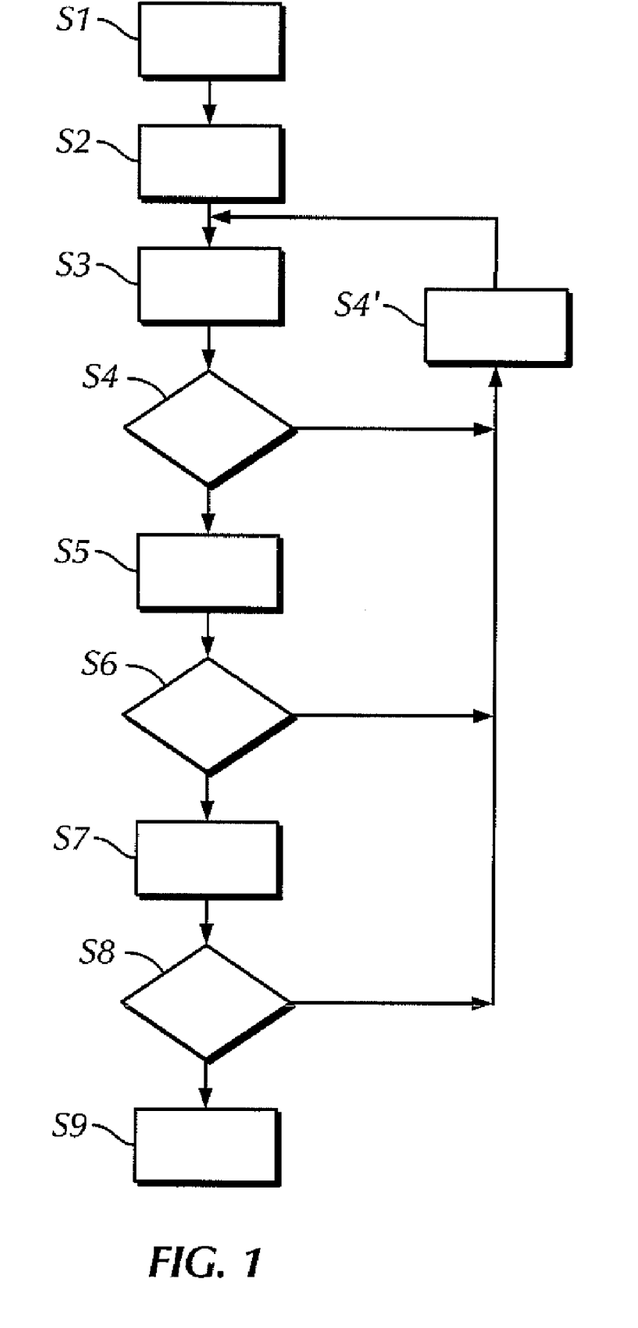
FIG. 1 shows the method according to the invention.

FIG. 1 shows the method according to the invention for calculation of positions x, y, as precisely as possible, of individual reflection points $R_{1-2}$ on the surface of an obstruction 200, in particular of a vehicle which is parked at the edge of the road with respect to a distance measurement apparatus 100, preferably installed in the side area of a different vehicle which is traveling past the obstruction. The distance measurement apparatus 100 may, for example, be an ultrasound, laser, infrared or radar distance measurement apparatus.

Figure 2:
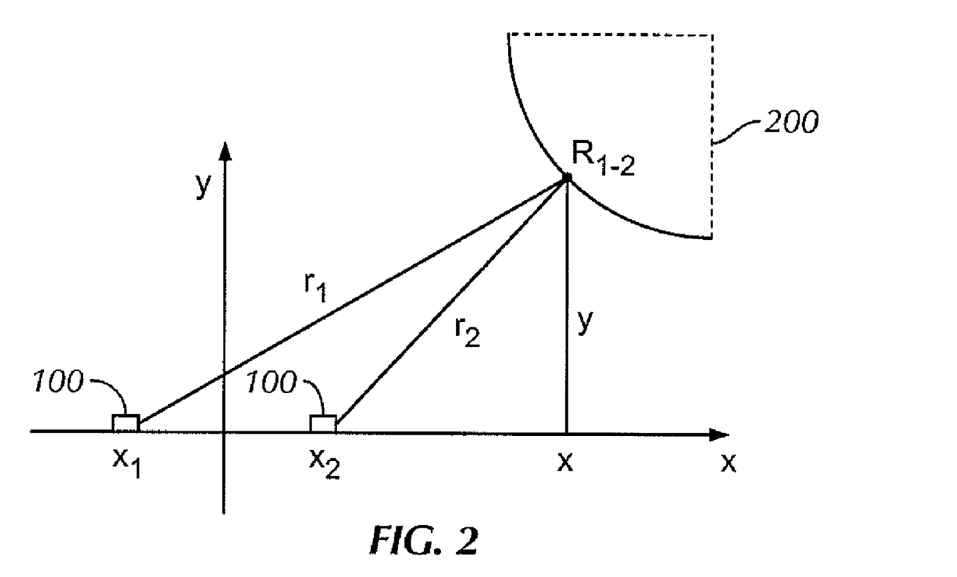
FIG. 2 shows an illustration of the method according to the invention for one reflection point.

In order to determine the precise contour profile of the obstruction 200, method step S1 of the method according to the invention first of all provides for the contour area to be measured to be assessed from a large number I of different positions $x_i$, where $i=1 \ldots I$. For this purpose, it is assumed that the distance measurement apparatus 100 is in each case positioned at different positions $x_1$, $x_2$ with respect to the obstruction 200, as is illustrated in FIG. 2. For the purposes of this description, the various positions which the distance measurement apparatus 100 in each case assumes with respect to the obstruction 200 in order to carry out the method according to the invention are referred to for simplicity only by their x component $x_i$, where $i=1 \ldots I$; the associated y and z positions are ignored here, for the sake of simplicity; however, in practice, they can always be quoted as further components of a position vector.

At each of said positions $x_i$, the distance measurement apparatus 100 sends a transmitted signal in the direction of the obstruction 200 to be assessed, and determines the time period between the transmission of the transmitted signal and the reception of a received signal as part of the transmitted signal reflected on the obstruction 200. The respective distance $r_i$ between the respective position $x_i$ of the distance measurement apparatus 100 and the surface of the obstruction 200 can then be determined with the aid of the propagation speed (which is assumed to be known) of the transmitted signal and with the knowledge of the respectively measured time duration. A position $x_i$ of the distance measurement apparatus 100 and the individual distance $r_i$ in each case measured from this position to the obstruction 200 are in each case referred to according to the invention as a value pair $x_i$, $r_i$. In plain words, each of these value pairs represents a circle with the radius $r_i$ about the center point $x_i$ on which the sought associated reflection point may be located on the surface of the obstruction 200.

Figure 3:
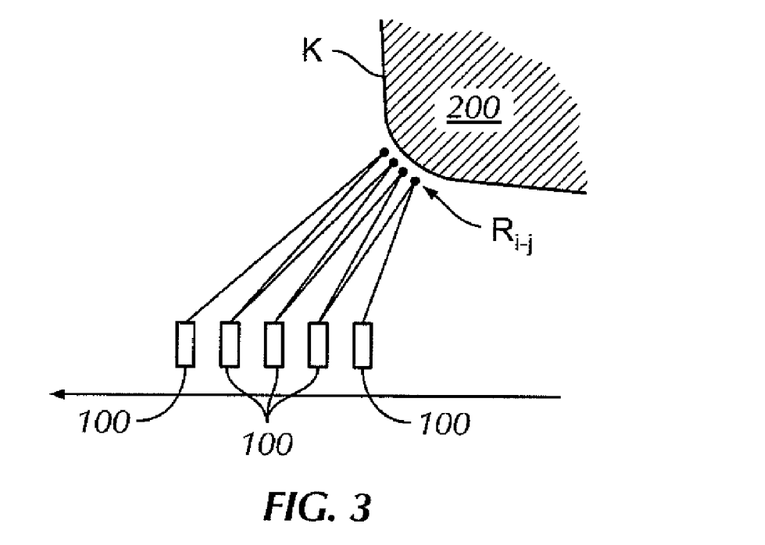
FIG. 3 shows an illustration of the method according to the invention for a plurality of reflection points.

After determination of a large number of such value pairs according to method step S1, for example while the other vehicle is driving past the obstruction 200 or the parked vehicle in the direction of the arrow as shown in FIG. 2 or FIG. 3, the determined value pairs $x_i$, $r_i$ are checked to determine whether they would together represent a harmonic or continuous contour profile. This is done by smoothing these value pairs, if necessary, such that value pairs whose value magnitudes obviously do not match the great majority of the other determined values are ignored or rejected.

In method step S3, two value pairs are in each case then selected from the large number of value pairs, which may have been smoothed if required, in order to use these two value pairs subsequently in method step S5 to calculate the position x, y of a reflection point on the obstruction 200. In principle, any desired value pairs from the large number of value pairs may be combined in pairs. However, it is preferable to combine value pairs which are adjacent with respect to the respective position of the distance measurement apparatus. As an alternative to this, however, it is, for example, also possible to combine with one another value pairs which are not directly adjacent, but are value pairs on the basis of the next-but-one x position, that is to say by way of example the value pairs $(x_1, r_1)$; $(x_3, r_3)$; $(x_3, r_3)$; $(x_5, r_5)$ etc. Individual value pairs can also be selected more than once for different pair combinations.

The only essential precondition for the selection of a suitable pair of value pairs for the calculation of the position of the reflection point $R_{1-2}$ according to the invention is that the circles which are represented by the two value pairs intersect. For this purpose, a check is carried out in method step S4 to determine whether the distance between the positions $x_1$, $x_2$ of the distance measurement apparatus for the two value pairs selected in method step S3 is less than the sum of their associated distance $r_1$, $r_2$. If this condition is not satisfied, then the method according to the invention cannot be used, and a new pair of value pairs must then be determined in accordance with method step S3; for this purpose, the method according to the invention then once again jumps from method step S4 to the start of method step S3, in which case however, method step S4' is used beforehand to ensure that the pairs of value pairs selected in the previous runs of method step S3 cannot be selected once again when method step S3 is carried out again.

Once two suitable value pairs $x_1$, $r_1$; $x_2$, $r_2$ have finally been selected in method steps S3 and S4, these are used in method step S5 in order to calculate the x coordinate and/or the y coordinate of the position of a reflection point $R_{1-2}$ which is associated with this value pair, with the aid of the triangular method.

In this case, the x coordinate is calculated using the following equation (1):

$$x = \frac{r_2^2 - r_1^2 - x_2^2 + x_1^2}{2*(x_1 - x_2)} \quad (1)$$

where
$x_1$ represents the first position of the distance measurement apparatus 100;
$x_2$ represents the second position of the distance measurement apparatus 100;
$r_1$ represents the first distance of the reflection point $R_{1-2}$; and
$r_2$ represents the second distance of the reflection point $R_{1-2}$.

The y component of the position of the reflection point $R_{1-2}$ is calculated using the following equation (2):

$$y = \sqrt{r_2^2 - (x-x_2)^2} \quad (2)$$

where
x represents the x coordinate of the position $R_{1-2}$;
$x_2$ represents the second position of the distance measurement apparatus 100; and
$r_2$ represents the second distance of the reflection point.

The position of the reflection point $R_{1-2}$ as calculated in this way has a greater probability of representing an actual point on the surface of the obstruction 200 the greater the magnitude of the difference between the x coordinate of the position of the reflection point and the x coordinate of the first or of the second position $x_1$, $x_2$ of the distance measurement apparatus 100.

This magnitude of said difference should be greater than a predetermined $\Delta x$ threshold value in order to prevent the corresponding x coordinate for the position of the reflection point $R_{1-2}$ from having to be rejected. In addition to this analysis, analogous threshold value comparisons are carried out for the differences $|x_2-x|$; $|y_1-y_{1-2}|$; and $|y_2-y_{1-2}|$ in method step S6. If the check in method step S6 finds that at least one of these differences does not exceed a respective threshold value associated with it, then the corresponding coordinate x and/or y determined in method step S5 is rejected. The method then jumps via method step S4' again to the start of method step S3.

However, if the check in method step S6 shows that the checked magnitudes are all greater than the threshold values which are individually associated with them, the position x, y of the reflection point $R_{1-2}$ as calculated in method step S5 is allowed, and is temporarily stored in method step S7. A check is then carried out in method step S8 to determine whether a sufficiently large number of positions of reflection points on the obstruction 200 have already been calculated for a calculation, as planned in method step S9, of the actual contour profile of the obstruction 200. If this is the case, the method jumps from method step S8 to S9. If not, the method jumps via method step S4' back to the start of method step S3, where further pairs of value pairs are selected for new position calculations of reflection points.

The plurality of positions which are generated by the repeated use of, in particular, method step S5 for different reflection points $R_{i-j}$ where i=. . . I and j=1 . . . J in the end have a geometric arrangement with respect to one another which represents the sought profile of the contour K of the obstruction 200.

Figure 4A:
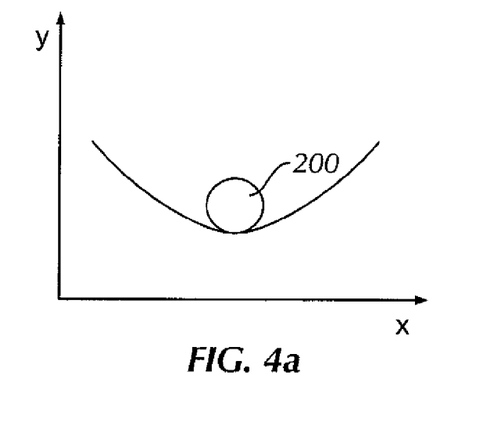
FIG. 4a shows an obstruction 200 and a calculated contour profile for the obstruction without using the method according to the invention.

FIG. 4 illustrates this relationship once again for an obstruction 200 with a circular cross section. It is assumed that a vehicle is driving past the obstruction 200 in the x direction, with the distance measurement apparatus 100 according to the invention having been installed in the side area of the vehicle. If this distance measurement apparatus 100 were to be operated without the method according to the invention, the dotted contour profile shown in FIG. 4a would be obtained from the x and y coordinates calculated in method step S5, with each dot representing a differently positioned reflection point.

One fundamental aspect of the method according to the invention is the choice of which of the Cartesian coordinates x, y for the positions of the reflection points $R_{i-j}$ will or will not be calculated using the equations (1) or (2). If all that is necessary for a specific application is to determine precisely a boundary of the obstruction 200 in the x direction, then it is generally sufficient to use only the formula (1). This results in the dotted line in FIG. 4b being limited essentially to the width of the obstruction 200 in the x direction.

Figure 4B:
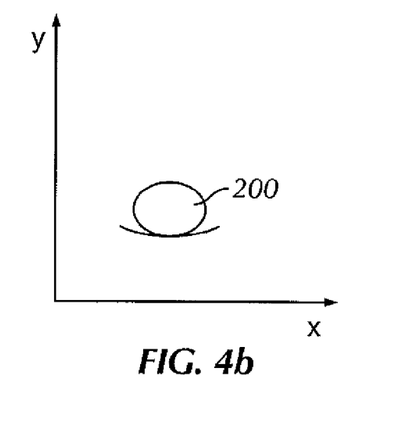
FIG. 4b shows the contour of the obstruction determined with the aid of the method according to the invention, when only the x component of the reflection points which represent the contour is calculated.
Figure 4C:
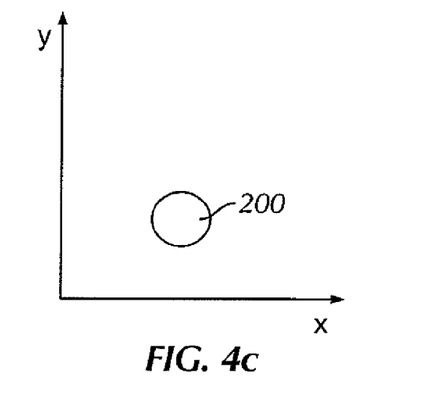
FIG. 4c shows the contour profile determined according to the invention when both the x coordinate and the y coordinate of the reflection points which represent the contour are determined.

In fact, the dotted line in FIG. 4b represents the actual contour profile of the obstruction 200 in only a relatively small area. Improved contour determination in the depth direction is achieved as shown in FIG. 4c by in addition also evaluating the equation (2), that is to say the y component. As can be seen in particular in FIG. 4c, the method according to the invention is preferably used for determination of the contour profile of, in particular, obstructions 200 with a convex shape.

Figure 5:
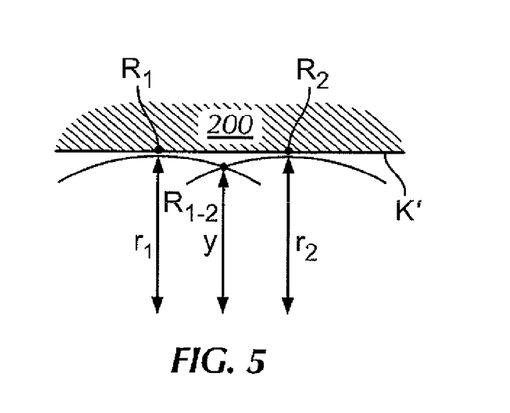
FIG. 5 shows an illustration of the method according to the invention for a contour profile of an obstruction parallel to a movement direction of the distance measurement apparatus, during a measurement process.

Although the method can in theory also be used for determination of the contour profile of obstructions 200 bounded by straight lines, with the boundary being located parallel to the movement direction x of the distance measurement apparatus 100, there is, however, no point in using it in cases such as these, as is shown in FIG. 5. To be more precise, as can be seen from FIG. 5, one value pair $x_1$, $r_1$; $x_2$, $r_2$ in each case in its own right leads to a quite accurate deduction of the position of the corresponding reflection points $R_1$, $R_2$ on the surface of the obstruction 200 which is bounded by straight lines, and thus on its contour profile K'. In this case, the use of the method according to the invention leads to the calculation of a distance or y component which is formed by the intersection point $R_{1-2}$ of the circles which are represented by the two value pairs $x_1$, $r_1$; $x_2$; $r_2$. The distance y determined in this way is, however, considerably shorter than the two distances $r_1$, or $r_2$, and is therefore not a good representative of the actual position of an associated reflection point on the surface of the obstruction 200.

However, FIG. 5 shows a different situation which applies in general for the method according to the invention, irrespective of whether the aim is to detect an obstruction 200 which is bounded by curves or straight lines. In this situation, the coordinate origin for the x, y position of the reflection point $R_{1-2}$ calculated according to the invention is located at half the distance between the positions $x_1$ and $x_2$.

Figure 6A:
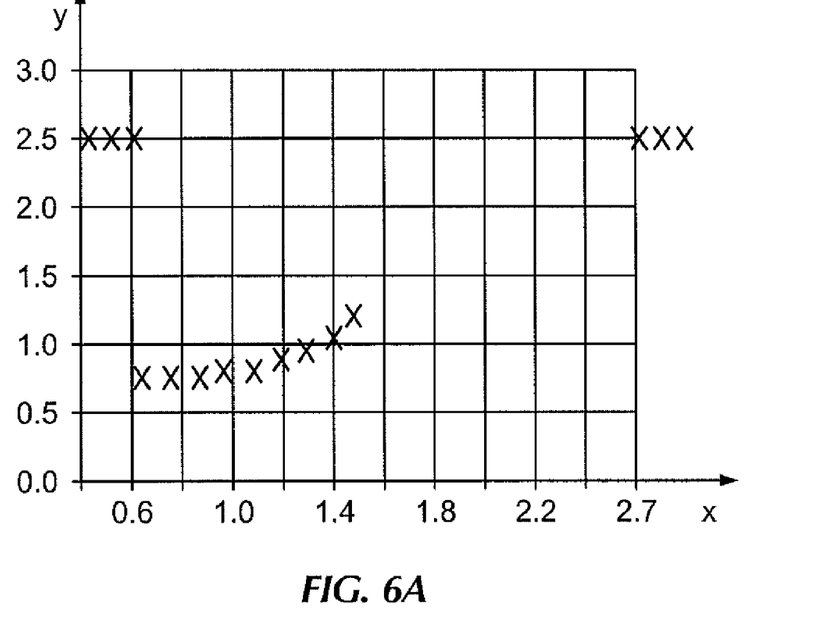
FIG. 6a shows the distribution of the positions of a large number of reflection points during determination of the profile of the contour of an obstruction according to the invention.
Figure 6B:
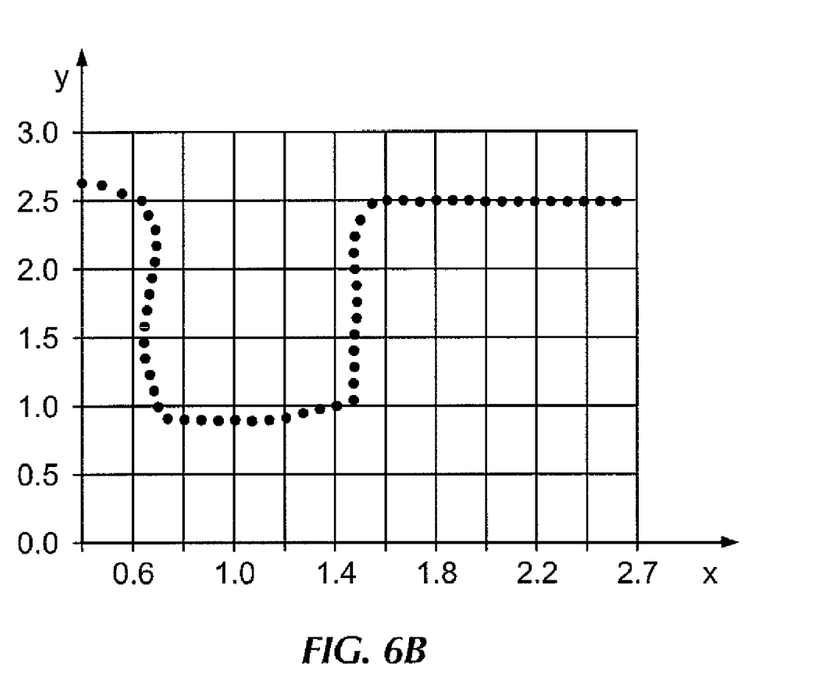
FIG. 6b shows the reconstruction of the contour profile of the obstruction on the basis of the distribution, as shown in FIG. 6a, of the calculated positions for the large number of reflection points.

Finally, FIG. 6 also shows an example of measured values for a real obstruction assessment. Specifically, in FIG. 6a, the positions which have been calculated and/or corrected using the method according to the invention are shown for a large number of different reflection points, with each of these positions being annotated by an x. These positions were determined on the basis of value pairs which were measured on the obstruction (not shown in FIG. 6a) as the distance measurement apparatus 100 was driven past in the x direction. The contour profile as illustrated in FIG. 6b of the obstruction 200 can then be constructed realistically in method step S9, as shown in FIG. 1, from the positions for the reflection points as illustrated in FIG. 6a.

The method according to the invention is preferably in the form of a computer program. If required, the computer program may be stored together with further computer programs in a data storage medium. The data storage medium may be a floppy disk, a compact disk, a so-called flash memory or the like. The computer program which is stored in the data storage medium can then be transmitted or transferred to or purchased by a customer as a product. As an alternative to transfer by means of a data storage medium, the computer program can also be transmitted to the customer without the assistance of the data storage medium via an electronic communication network, in particular the Internet.

The invention claimed is:

1. A method for determination of the position (x, y) of at least one reflection point ($R_{1-2}$) on the surface of an obstruction, comprising the following steps:

calculation of a first distance ($r_1$) between the reflection point and a first position ($x_1$) of a distance measurement apparatus, from a time period between transmission of a first transmitted signal from the distance measurement apparatus at the position ($x_1$) to the obstruction and reception of a received signal as part of the transmitted signal reflected on the obstruction;

characterized by calculation of a second distance ($r_2$) of the reflection point with respect to a second position ($x_2$) of the distance measurement apparatus analogously to the calculation of the first distance ($r_1$); and calculation of the position (x, y) of the reflection point ($R_{1-2}$) with the aid of the triangulation method from a first value pair ($x_1$, $r_1$), comprising the first position ($x_1$) of the distance measurement apparatus and the first distance ($r_1$) and a second value pair ($x_2$, $r_2$), comprising the second position ($x_2$) of the distance measurement apparatus and the second distance ($r_2$);

characterized in that the x coordinate (x) of the position of the reflection point ($R_{1-2}$) is calculated using the following equation (1):

$$x = \frac{r_2^2 - r_1^2 - x_2^2 + x_1^2}{2*(x_1 - x_2)} \quad (1)$$

$x_1$ represents the first position of the distance measurement apparatus;

$x_2$ represents the second position of the distance measurement apparatus;

$r_1$ represents the first distance of the reflection point ($R_{1-2}$);

$r_2$ represents the second distance of the reflection point ($R_{1-2}$); and outputting the position (x, y) calculated.

2. The method as claimed in claim 1, characterized in that the calculated x coordinate (x) of the position of the reflection point ($R_{1-2}$) is rejected if the magnitude of the difference between the x coordinate (x) of the position of the reflection point ($R_{1-2}$) and the x coordinate of the first or second position ($x_1$, $x_2$) of the distance measurement apparatus is less than a predetermined $\Delta x$ threshold value.

3. A method for determination of the position (x, y) of at least one reflection point ($R_{1-2}$) on the surface of an obstruction, comprising the following steps:

calculation of a first distance ($r_1$) between the reflection point and a first position ($x_1$) of a distance measurement apparatus, from a time period between transmission of a first transmitted signal from the distance measurement apparatus at the position ($x_1$) to the obstruction and reception of a received signal as part of the transmitted signal reflected on the obstruction;

characterized by calculation of a second distance ($r_2$) of the reflection point with respect to a second position ($x_2$) of the distance measurement apparatus analogously to the calculation of the first distance ($r_1$); and calculation of the position (x, y) of the reflection point ($R_{1-2}$) with the aid of the triangulation method from a first value pair ($x_1$, $r_1$), comprising the first position ($x_1$) of the distance measurement apparatus and the first distance ($r_1$) and a second value pair ($x_2$, $r_2$), comprising the second position ($x_2$) of the distance measurement apparatus and the second distance ($r_2$);

characterized in that the y coordinate (y) of the position of the reflection point is calculated using the following equation (2):

$$y = \sqrt{r_2^2 - (x - x_2)^2} \quad (2)$$

where x represents the x coordinate of the position of the reflection point ($R_{1-2}$);

$x_2$ represents the second position of the distance measurement apparatus; and $r_2$ represents the second distance of the reflection point; and outputting the position (x,y) calculated.

4. The method as claimed in claim 3, characterized in that the calculated y coordinate (y) of the position of the reflection point ($R_{1-2}$) is rejected if the magnitude of the difference between the y coordinate (y) of the position of the reflection point ($R_{1-2}$) and the first or second distance ($r_1$, $r_2$) of the reflection point ($R_{1-2}$) to the distance measurement apparatus is less than a predetermined $\Delta r$ threshold value.

5. The method as claimed in claim 1, characterized in that the first and the second value pairs ($x_1$, $r_1$) ($r_1$, $r_2$) are selected in pairs from a large number of value pairs (xi, ri where i=1 . . . I).

6. The method as claimed in claim 5, characterized in that the selection of value pairs in pairs from the large number of value pairs and the calculation, based on this, of in each case one position (x, y) of a reflection point ($R_{1-2}$) is repeated for a large number of differently positioned reflection points on the obstruction.

7. The method as claimed in claim 6, characterized in that the selection of the value pairs in pairs from the large number is carried out as required.

8. A computer program with a program code stored on a computer readable medium for a distance measurement apparatus, characterized in that the computer program is designed to carry out the method as claimed in claim 1.

9. A data storage medium characterized by the computer program as claimed in claim 8.

10. A distance measurement apparatus for determination of the position (x, y) of at least one reflection point ($R_{1-2}$) on the surface of an obstruction, comprising:

a calculation device for calculation of a first distance ($r_1$) between the reflection point and a first position ($x_2$) of the distance measurement apparatus from a time period between transmission of a first transmitted signal from the distance measurement apparatus at the position ($x_1$) to the obstruction and reception of a received signal as part of the transmitted signal reflected on the obstruction;

characterized in that the calculation device is designed to calculate a second distance ($r_2$) of the reflection point with respect to a second position ($x_2$) of the distance measurement apparatus analogously to the calculation of the first distance; and to calculate the position (x, y) of the reflection point ($R_{1-2}$) with the aid of the triangulation method from a first value pair ($x_1$, $r_1$), comprising the first position ($x_1$) of the distance measurement apparatus and the first distance ($r_1$) and a second value pair ($x_2$, $r_2$), comprising the second position ($x_2$) of the distance measurement apparatus and the second distance ($r_2$);

characterized in that the x coordinate (x) of the position of the reflection point ($R_{1-2}$) is calculated using the following equation (1):

$$x = \frac{r_2^2 - r_1^2 - x_2^2 + x_1^2}{2*(x_1 - x_2)} \quad (1)$$

$x_1$ represents the first position of the distance measurement apparatus;

$x_2$ represents the second position of the distance measurement apparatus;

$r_1$ represents the first distance of the reflection point ($R_{1-2}$);

$r_2$ represents the second distance of the reflection point ($R_{1-2}$).

11. The method as claimed in claim 1, wherein the distance measurement apparatus is an ultrasound distance measurement apparatus.

12. The method as claimed in claim 5, wherein the first and the second value pairs ($x_1$, $r_1$) ($r_1$, $r_2$) are selected in pairs from a large number of value pairs (xi, ri where i=1 . . . I) after the large number of value pairs (xi, ri) have been smoothed.

13. The computer program of claim 8, wherein the distance measurement apparatus is an ultrasound distance measurement apparatus.

14. The distance measurement apparatus of claim 10, wherein the distance measurement apparatus is an ultrasound distance measurement apparatus.

15. A distance measurement apparatus for determination of the position (x, y) of at least one reflection point ($R_{1-2}$) on the surface of an obstruction, comprising:

a calculation device for calculation of a first distance ($r_1$) between the reflection point and a first position ($x_2$) of the distance measurement apparatus from a time period between transmission of a first transmitted signal from the distance measurement apparatus at the position ($x_1$) to the obstruction and reception of a received signal as part of the transmitted signal reflected on the obstruction;

characterized in that the calculation device is designed to calculate a second distance ($r_2$) of the reflection point with respect to a second position ($x_2$) of the distance measurement apparatus analogously to the calculation of the first distance; and to calculate the position (x, y) of the reflection point ($R_{1-2}$) with the aid of the triangulation method from a first value pair ($x_1$, $r_1$), comprising the first position ($x_1$) of the distance measurement apparatus and the first distance ($r_1$) and a second value pair ($x_2$, $r_2$), comprising the second position ($x_2$) of the distance measurement apparatus and the second distance ($r_2$);

characterized in that the y coordinate (y) of the position of the reflection point is calculated using the following equation (2):

$$y = \sqrt{r_2^2 - (x - x_2)^2} \quad (2)$$

where x represents the x coordinate of the position of the reflection point ($R_{1-2}$);

$x_2$ represents the second position of the distance measurement apparatus; and $r_2$ represents the second distance of the reflection point.

16. A computer program with a program code stored on a computer readable medium for a distance measurement apparatus, characterized in that the computer program is designed to carry out the method as claimed in claim 3.

* * * * *